(12) United States Patent
Bell et al.

(10) Patent No.: US 10,592,979 B2
(45) Date of Patent: Mar. 17, 2020

(54) MANAGING BLOCKCHAIN TRANSACTIONS

(71) Applicant: International Business Machines Corporation, Armonk, NY (US)

(72) Inventors: Donald S. Bell, Benton, AR (US); Michael J. Hudson, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 15/659,690

(22) Filed: Jul. 26, 2017

(65) Prior Publication Data

US 2019/0035014 A1  Jan. 31, 2019

(51) Int. Cl.
*G06Q 40/00* (2012.01)
*H04L 9/06* (2006.01)
*H04L 9/32* (2006.01)

(52) U.S. Cl.
CPC .......... *G06Q 40/00* (2013.01); *H04L 9/0637* (2013.01); *H04L 9/0643* (2013.01); *H04L 9/32* (2013.01); *H04L 9/3239* (2013.01); *G06Q 2220/10* (2013.01); *H04L 2209/38* (2013.01)

(58) Field of Classification Search
CPC .. G06Q 40/00; G06Q 20/401; H04L 2209/38; H04L 9/0637; H04L 9/3236; H04L 9/3239; H04L 9/3265; G06F 21/64
See application file for complete search history.

(56) References Cited

U.S. PATENT DOCUMENTS

| | | | |
|---|---|---|---|
| 2016/0321675 A1 | 11/2016 | McCoy et al. | |
| 2016/0321751 A1* | 11/2016 | Creighton, IV | G06Q 40/04 |
| 2017/0075938 A1 | 3/2017 | Black et al. | |
| 2017/0337534 A1* | 11/2017 | Goeringer | H04L 9/3239 |
| 2018/0068359 A1* | 3/2018 | Preston | G06Q 30/0283 |
| 2018/0198624 A1* | 7/2018 | Bisti | H04L 9/3247 |
| 2018/0285837 A1* | 10/2018 | Wu | G06Q 20/06 |
| 2018/0285996 A1* | 10/2018 | Ma | G06Q 50/184 |
| 2018/0323963 A1* | 11/2018 | Stollman | H04L 9/3239 |

OTHER PUBLICATIONS

Dennis et al., A Temporal Blockchain: A Formal Analysis, 2016 International Conference on Collaboration Technologies and Systems, IEEE, pp. 430-437, 2016.

* cited by examiner

*Primary Examiner* — Jamie R Kucab

(57) ABSTRACT

An example operation may include one or more of changing a status of a current blockchain to a closed and retired status based on expiration of a limited time window, creating a genesis block associated with a new blockchain, storing a world state of the current blockchain in the genesis block, creating one or more smart contracts, storing the one or more smart contracts on the new blockchain, and initiating an open stage on the new blockchain, and the open stage permits one or more potential blockchain transactions to be written to the new blockchain.

20 Claims, 6 Drawing Sheets

MANAGING BLOCKCHAIN TRANSACTIONS

TECHNICAL FIELD

This application generally relates to managing transactions, and more particularly, to managing blockchain transactions.

BACKGROUND

A blockchain may be used as a public ledger to store information. Since any individual or entity can provide information to a blockchain, this information should be reviewed and confirmed. This operation is known as consensus. There are two types of consensus centralized and decentralized. Centralized consensus includes one central database that is used to rule transaction validity. A decentralized consensus transfers authority and trust to a decentralized network and enables its nodes to continuously and sequentially record their transactions on a public "block", creating a unique "chain" referred to as a blockchain. Cryptography, via hash codes, is used with a blockchain to secure an authentication of a transaction source and removes the need for a central intermediary.

In a conventional daily ledger environment, a transaction person or 'transactor' presents a transaction in physical or digital form to their transaction institution. The institution posts the transaction to the distributed ledger. The posting process to the distributed ledger validates the transaction is compliant with minimum standards and encrypts the details so only authorized parties can decrypt and view such details. The distributed ledger notifies members of the new transaction on the corresponding network. Members review the transactions via publicly visible details to determine if they are eligible to process the transaction. An interested third party institution may decrypt the transaction details and further validate the transaction, for example, by ensuring the account is valid and the items mentioned in the transaction are available. The third party institution posts back to the distributed ledger its acceptance or rejection of the transaction. The posting process to the distributed ledger encrypts the response and the distributed ledger notifies members of the transaction's status being updated. The interested third party decrypts the updated information. Rejected transactions signal the third party institution will not honor the transaction. The current distributed ledger best practices advocate not including large amount of data in the ledger.

SUMMARY

One example method of operation may include one or more of changing a status of a current blockchain to a closed and retired status based on expiration of a limited time window, creating a genesis block associated with a new blockchain, storing a world state of the current blockchain in the genesis block, creating one or more smart contracts, storing the one or more smart contracts on the new blockchain, and initiating an open stage on the new blockchain, wherein the open stage permits one or more potential blockchain transactions to be written to the new blockchain.

Another example embodiment provides an apparatus including a processor configured to perform one or more of change a status of a current blockchain to a closed and retired status based on expiration of a limited time window, create a genesis block associated with a new blockchain, store a world state of the current blockchain in the genesis block, create one or more smart contracts, and a memory configured to store the one or more smart contracts on the new blockchain, and the processor is further configured to initiate an open stage on the new blockchain, the open stage permits one or more potential blockchain transactions to be written to the new blockchain.

Another example embodiment provides a non-transitory computer readable storage medium configured to store instructions that when executed cause a processor to perform one or more of changing a status of a current blockchain to a closed and retired status based on expiration of a limited time window, creating a genesis block associated with a new blockchain, storing a world state of the current blockchain in the genesis block, creating one or more smart contracts, storing the one or more smart contracts on the new blockchain, and initiating an open stage on the new blockchain, the open stage permits one or more potential blockchain transactions to be written to the new blockchain.

DETAILED DESCRIPTION

Figure 1A:
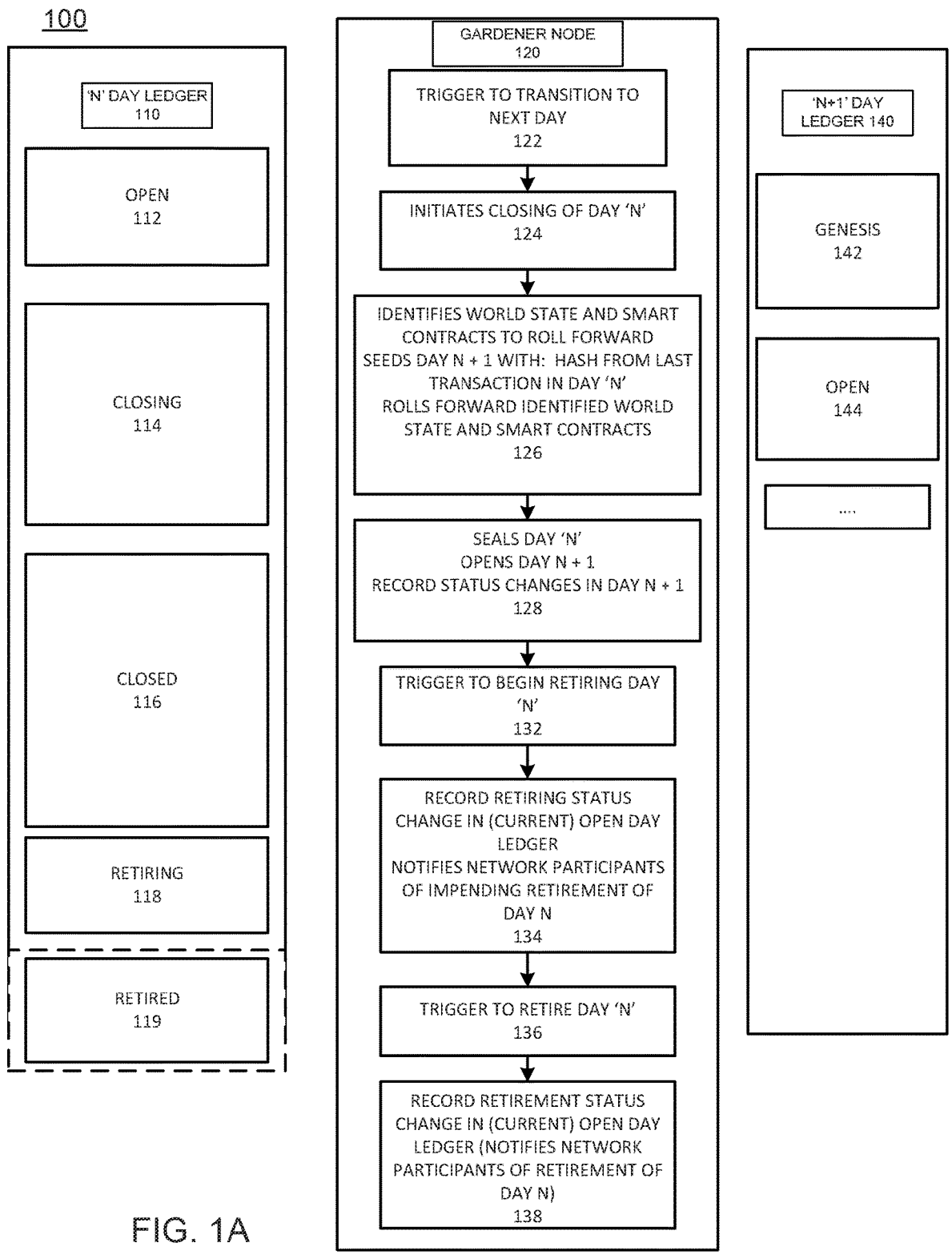
FIG. 1A illustrates a logic diagram of ledger statuses, a next day ledger and a gardener node operation, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to managing transactions conducted during a daily period via a shared ledger and in another embodiment relates to using the shared ledger to update daily transactions while maintaining the shared ledger for each passing day.

The settlement of transactions can be initiated by any party to the transaction. Regardless of the initiator, the settlement process is initiated by creating a settlement letter on a distributed ledger. The creation of a settlement letter identifies all accepted transactions that have not been settled between third parties. The distributed ledger encrypts the settlement letter and notifies the network of the creation of a settlement letter. The parties involved with the settlement letter may decrypt the settlement details. The initiating party takes the settlement letter's details and creates a book transfer with the central authority. The initiating party then requests the distributed ledger mark the settlement letter as fulfilled by providing the book transfer transaction detail. The fulfillment process causes the distributed ledger to validate that the book transfer transaction is valid and upon verification marks all the settlement letters as fulfilled. The distributed ledger notifies members of the settled transactions and the fulfilled settlement letter. The member parties involved will be able to decrypt the transaction and settlement letter details.

Example embodiments provide a trusted ledger, such as a blockchain, that could be used to store daily ledgers which are specialized distributed ledgers that are based on a single day of transactions (i.e., 24 hours, regular business hours, etc.), and which include a gardener node as a privileged member of the blockchain. The day ledgers are blockchains that track individual assets as smart contracts for a specific topic domain (i.e., purpose, requirements, standards, etc., of the blockchain) and a time period for active status (e.g., one hour, 8 hours, 24 hours, 7 days, etc.).

FIG. 1A illustrates a logic diagram 100 of ledger statuses, a next day ledger and a gardener node operation, according to example embodiments. Referring to FIG. 1A, in general, the gardener node 120 is a trusted node that ensures the hash/seed from a present day ledger 110 is preserved for the next-generation descendent business day 140. Also, the gardener node 120 is responsible for initiating the open status 112, closing status 114, closed status 116, retiring status 118 and retired status 119, which are all part of the daily ledger lifecycle.

The next day ledgers effectively borrow or copy from an ancestor day ledger(s) that is no longer active and/or needed. In general, the day ledger operates in accordance with a lifecycle of genesis creation, open status, closing status, closed status, retiring status and a retired status. The genesis stage 142 permits for the provisioning of the ledger for a next-generation. During the genesis stage, the gardener node 120 creates the next day ledger genesis block using the previous business day sealing block hash value 122. The first day ledger has its ancestor block attribute set to zero by the gardener node. During genesis creation, the gardener node 120 establishes roles, participants and assigns those participants to certain roles on the new ledger and deploys the approved smart contract templates to the new ledger. After the gardener node has completed the seeding (i.e., including the hash) of the descendent/new day ledger the ledger enters the open stage 144. The open stage permits for the execution of transactions on the ledger similarly to a standard distributed ledger or blockchain.

The gardener node determines when to close a current/previous day ledger and seed the follow on descendent. The gardener node places the (current) open ledger 'N' in the closing state 124. The closing state restricts updates to the ledger to only the gardener node. The gardener node identifies the closing ledger state (i.e., world state) data that is required to rollover to the next day ledger 'N+1' including but not limited to hash values, smart contracts, world state information, etc., 126. Also, the gardener node 120 provisions the next day ledger setting the genesis block's ancestor attribute to the hash value of the ancestor day ledger's last block's hash value (i.e., seeding) and initializes the new ledger (blockchain) with the rolled-over world state data from the previous/current day ledger. The gardener node will then bring the current day ledger into the closed stage and the new day 'N+1' ledger into the open stage 128, which permits for standard transaction processing to occur by members of the ledger/blockchain.

A day ledger in the closed stage permits for the ledger's transactions and state data to be queried, however, no updates will be honored after the ledger's sealing block. Also, the gardener node will determine when to retire the day ledger, which is different from closing or closed. The gardener node 120 moves the current day ledger 110 into the retiring stage 118 via operation 132 and notifies the network participants of the impending retiring by recording the status change 134. The retiring status in the (current) open ledger permits network participants to query the overall ledger and related details and archive the desired data in an archiving destination. The gardener node will then retire 136 the current day ledger from the network and record the retired status 138 and related details in the (current) day ledger.

In general, the gardener node 120 determines the exact time on when to start a new ledger. The gardener node makes this determination based on the ledger's/network's rules. One example may be a transaction clearing and settlement on a US-based network as a daily routine corresponding to a day ledger being closed. In another example, a new ledger would be created at the end of each instrument exchange window. Exchange windows exist for each day (e.g. Monday-Friday excluding holidays) and the window ends at midnight eastern time in many instances. The assets on the blockchain will have some type of finality. However, the genesis block also includes non-finalized assets in the new day ledger's genesis block. Those non-finalized assets are rolled forward which preserves provenance and immutability across ledgers. In addition to non-finalized assets being included in the genesis block, the genesis block also includes the participants, their roles and their identities, which may also be required for continued operation. Each blockchain peer can decide what they want to do with the retired blockchain. For example, a peer can simply maintain a blockchain in a read-only manner or purge the retired blockchain, so the day a peer is seeking to audit will dictate the blockchain accessed when looking for ledger data.

For example purposes, the seed and the hash are the same. The sealing block's hash is a seed value of the genesis block, the seed permits for follow-on work and contributes to immutability by pointing back to a previous block/state, which includes work/assets. Also, rolling over in-progress/non-finalized assets ensures that transactions are not purged out of a blockchain. By rolling such transaction data forward, purging may be performed on the past transactions without losing the provenance of non-finalized assets. The retiring status recorded in the new ledger would ensure the retirement details would be stored as a transaction for audit purposes in the next day ledger/blockchain.

When pruning expired transactions, at a given point in time, for example, at the end of the day, the gardener node(s) determines that a new ledger is required. Each gardener node attempts to generate a sealing block, which indicates that no new blocks may be added to the ledger, and creates a genesis block which seeds a new ledger and rolls forward all 'in-flight'/pending transactions. Transactions will not expire but will 'complete' at some point. Completed transactions are not rolled into the genesis block, they remain in the old, retired ledger (i.e., previous blockchain).

In general, there are two kinds of nodes, gardener nodes, which may generate sealing and genesis blocks, and regular nodes which cannot perform those operations of a gardener node. All nodes can validate transactions and 'mine' them into blocks. All nodes participate in the consensus network using whatever consensus procedure is implemented. The smart contract has a time period, and a topic domain. In general, only gardener nodes can create a genesis block. Only gardener nodes can create a sealing block. New blocks cannot be added to a ledger that has been closed. But any participant with sufficient privileges may read the ledger. No nodes have write or update access once the ledger was sealed with a sealing block, thereafter all nodes have read-only/query access. Typically retired ledgers would be pruned and discarded, but nodes could optionally keep the retired ledger or portions thereof. No nodes have write or update access since the ledger was sealed with a sealing block and all nodes have read-only/query access. The closing and closed statuses would be recorded in the original ledger and the next ledger's genesis block would correspond with that closed state. A transaction is an instance existing within the framework of the smart contract. New transactions are constantly being added, but the smart contract code itself would be updated infrequently. Also, the genesis block would be a hash of the previous sealing block and all the in-flight transactions from the ledger that have been retired.

Figure 1B:
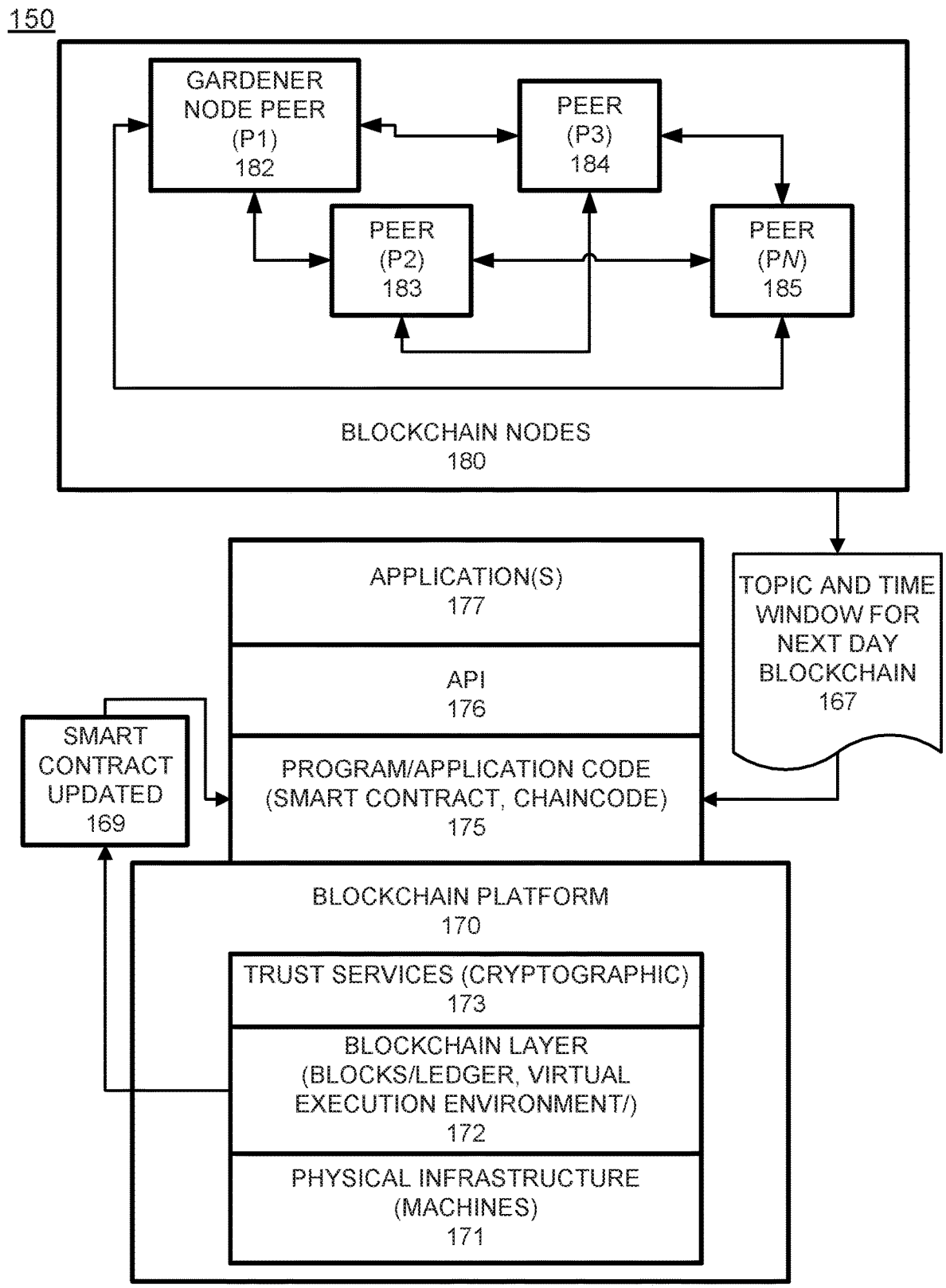
FIG. 1B illustrates a blockchain system configuration according to example embodiments.

FIG. 1B illustrates a blockchain system configuration according to example embodiments. The blockchain system 150 may include certain common blockchain elements, such as a group 180 of assigned peers 182-185 which participate in the blockchain transaction addition and validation process (consensus). Any of the blockchain peer nodes 180 may initiate new transactions and seek to write to the blockchain immutable ledger 172, a copy of which is stored on the underpinning physical infrastructure 171. In this configuration, a gardener node 182 may be assigned to manage the daily blockchain and may be part of the peer node group. The customized blockchain configuration may include one or applications 177 which are linked to APIs 176 used to access and execute stored program/application code (e.g., chain code and/or smart contracts) 175, which is created according to the customized configuration sought by the participants. This code can be deployed as a transaction and installed, via appending to the distributed ledger, on all blockchain peer nodes.

The blockchain base 170 includes the various layers of blockchain data, services (e.g., cryptographic trust services, virtual execution environment), and underpinning physical computer infrastructure necessary to receive and store new transactions and provide access to auditors which are seeking to access data entries. The blockchain layer 172 exposes an interface that provides access to the virtual execution environment necessary to process the program code and engage the physical platform 171. Cryptographic trust services 173 are used to verify transactions and keep information private. As a result, smart contract changes which are proposed and/or approved 178 (i.e., via consensus among peers) can be created and updated on the blockchain to accurately update consumer information.

The blockchain configuration of FIG. 1B may process and execute program/application code 175 by way of the interfaces exposed, and the services provided, by blockchain platform 170. The code may control blockchain assets, for example, it can store and transfer data, and may be executed by the blockchain in the form of a smart contract, which includes chain code with conditions or other code elements subject to its execution. The smart contracts 175 may be created to execute reminders, updates, and/or other notifications subject to the changes, updates, etc. The smart contracts can themselves be used to identify rules and roles associated with a daily ledger. For example, the smart contract may define a topic and time window for a next day blockchain 167. The policies and criteria, once decided by the peers via consensus, can be updated 169 into the smart contracts 175 accordingly.

Figure 2:
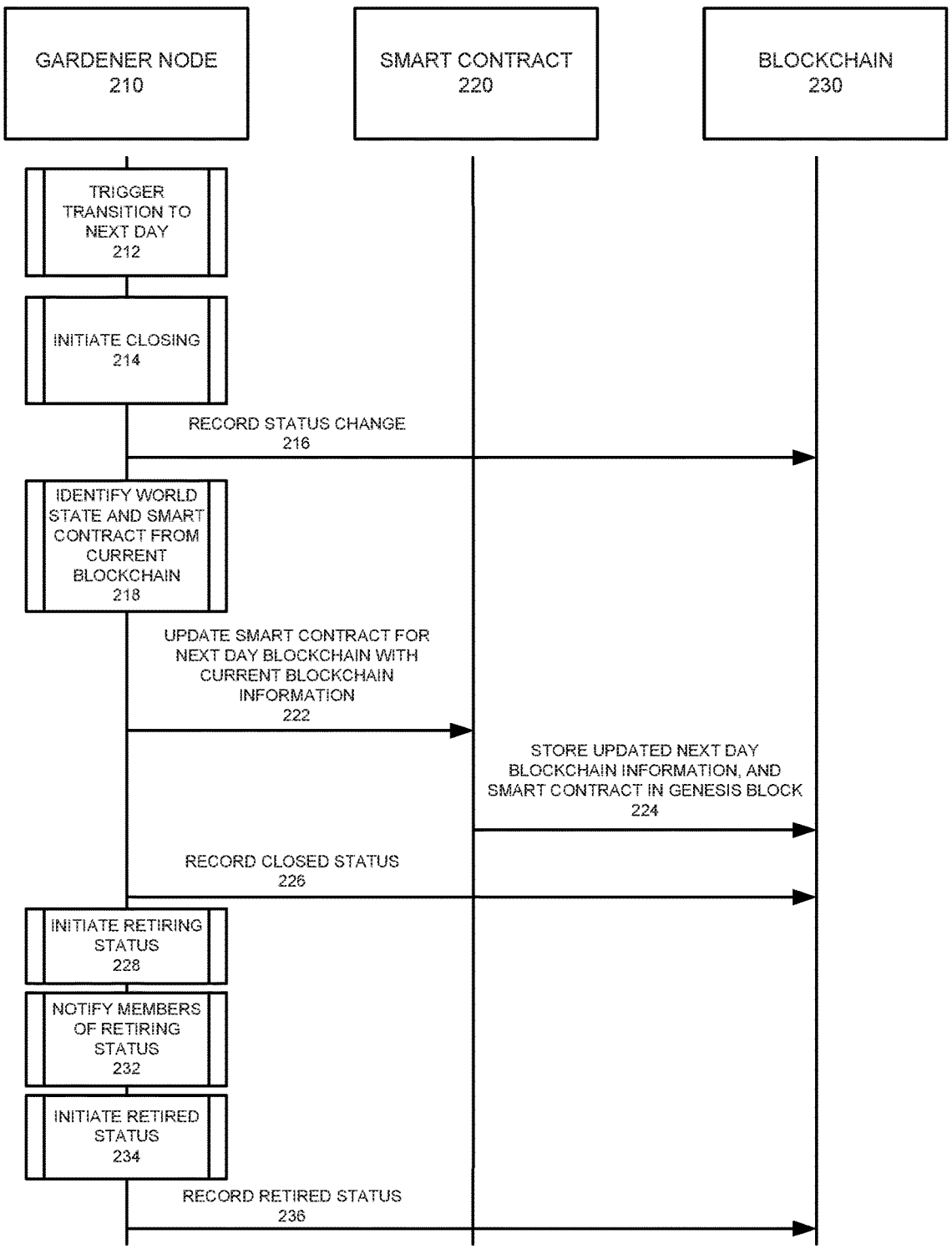
FIG. 2 illustrates a system messaging diagram of the interactions between a blockchain member, a smart contract(s) and the blockchain, according to example embodiments.

FIG. 2 illustrates a system messaging diagram of the interactions between a blockchain component, a smart contract(s) and the blockchain, according to example embodiments. Referring to FIG. 2, the system 200 may include a number of components or modules which may include software, hardware or a combination of both. The components may include a first component, such as a gardener node 210 making ledger decisions which includes referencing a second component, such as a smart contract 220 and updating a third component, such as a blockchain 230. The blockchain may be the current day or a next day blockchain depending on the nature of the update. In operation, a trigger may transition to a next day 212 which indicates it is time to create the next day ledger. The initial status change to the current ledger may be set to a closing status from an open status 214. This status change and any status change is logged 216 in the blockchain 230. The gardener node is also responsible for identifying a world state and using the previous and/or modifying a smart contract for the next day ledger 218. The smart contract 220 may be updated 222 to include the current day information or to include different information. The updated blockchain information may include the smart contract and world state information stored in the genesis block of the next day ledger 224. The status change to closed 226 is also recorded. A retired status may be set by the gardener node and recorded 226. The retiring status may be initiated 228 and members may be notified to archive the data of interest 232. The retired status is then initiated 234 and recorded 236.

In one embodiment, the first component, the second component and the third component may be separate devices such as servers, computers or other computational devices or may be a single device. In other embodiments, the first component and the second component may be enclosed as, or perform as, a single device, the first component and the third component may be enclosed as, or perform as, a single device, and the second component and the third component may be enclosed as, or perform as, a single device. The components or devices 210, 220 and 230 may be directly connected or communicably coupled to one another, in a wired or wireless manner, and may reside locally and/or remotely.

Figure 3A:
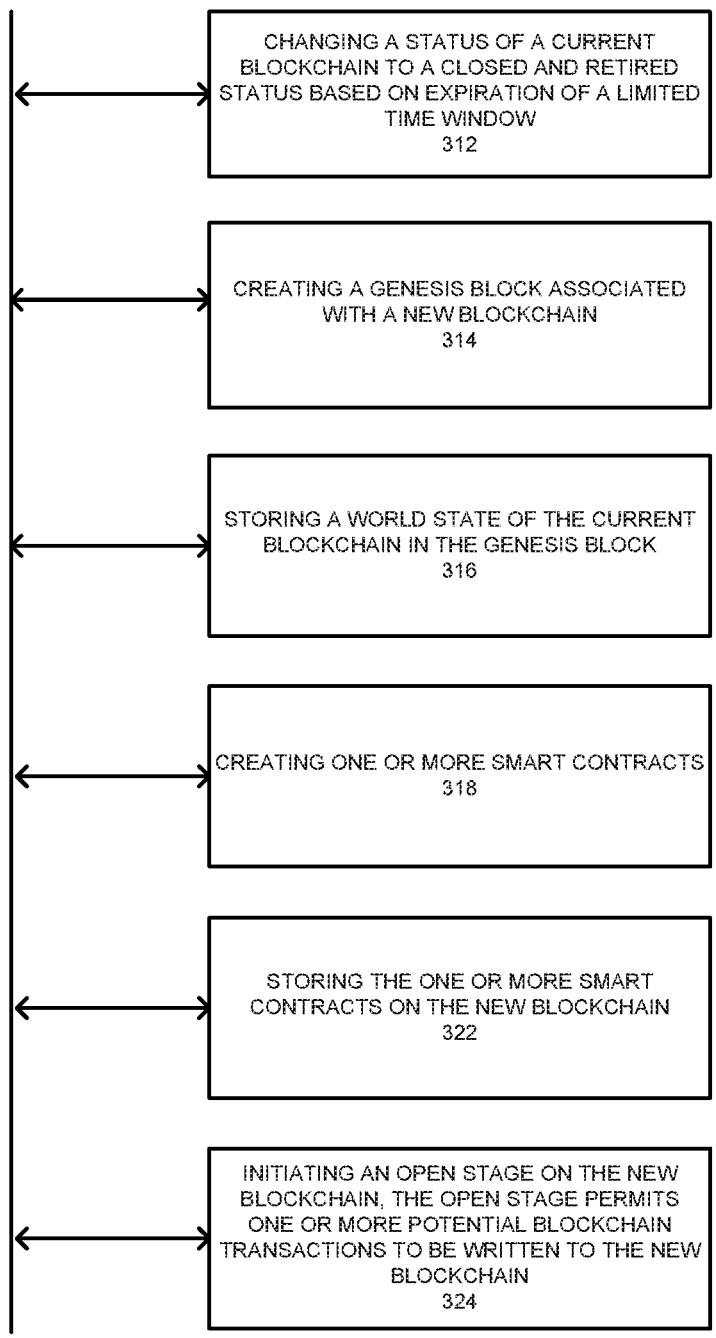
FIG. 3A illustrates a flow diagram of an example method of managing day ledgers in the blockchain, according to example embodiments.

FIG. 3A illustrates a flow diagram 300 of an example method of managing day ledgers in the blockchain, according to example embodiments. Referring to FIG. 3A, the method may include one or more of changing a status of a current blockchain to a closed and retired status based on expiration of a limited time window 312, creating a genesis block associated with a new blockchain 314, storing a world state of the current blockchain in the genesis block 316, creating one or more smart contracts 318, storing the one or more smart contracts on the new blockchain 322, and initiating an open stage on the new blockchain, where the open stage permits one or more potential blockchain transactions to be written to the new blockchain 324.

Other examples include determining when to close the new blockchain based on a new limited time window, and when the new limited time window has matured, changing the new blockchain status to a closing state. The closing state restricts updates to the blockchain to only a designated gardener node. Also, responsive to the determining when to close the new blockchain, initiating another new blockchain, and determining world state information of the new blockchain that will be included in the another new blockchain. The method may further include creating a genesis block associated with the another new blockchain, and setting a genesis block attribute of the genesis block associated with the another new blockchain to a hash value of a last block of the new blockchain. The method may also provide initiating an open stage on the another new blockchain, and including the world state information of the new blockchain in the another new blockchain. The method may further provide, responsive to initiating the open stage on the another new blockchain, transmitting notifications regarding closure of the new blockchain to members of the new blockchain, and initiating a retiring status to the new blockchain which prevents new transactions from being written to the new blockchain by any member of the blockchain.

Figure 3B:
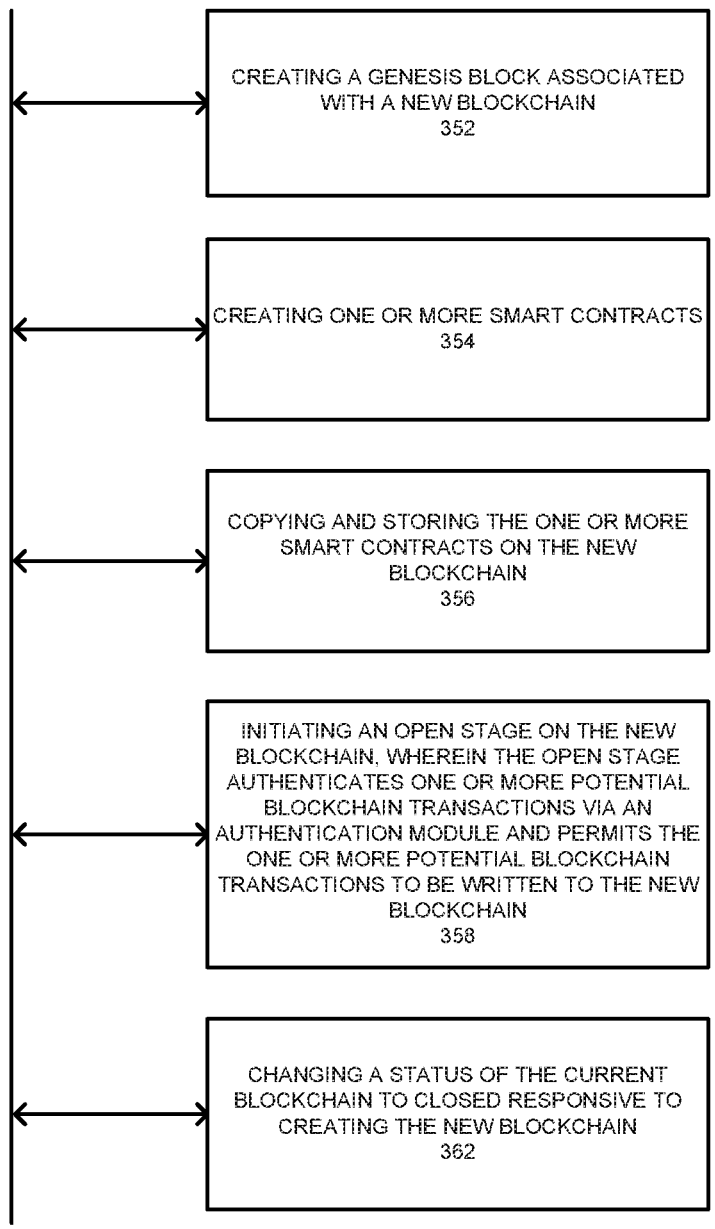
FIG. 3B illustrates another flow diagram of another example of managing day ledgers in the blockchain, according to example embodiments.

FIG. 3B illustrates another flow diagram 350 of another example of managing day ledgers in the blockchain, according to example embodiments. The method may provide one or more of creating a genesis block associated with a new blockchain 352, creating one or more smart contracts 354, copying and storing the one or more smart contracts on the new blockchain 356, initiating an open stage on the new blockchain 358, where the open stage authenticates one or more potential blockchain transactions via an authentication module and permits the one or more potential blockchain transactions to be written to the new blockchain and, and changing a status of a previous blockchain to a closed status, responsive to determining to create the new blockchain 362.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
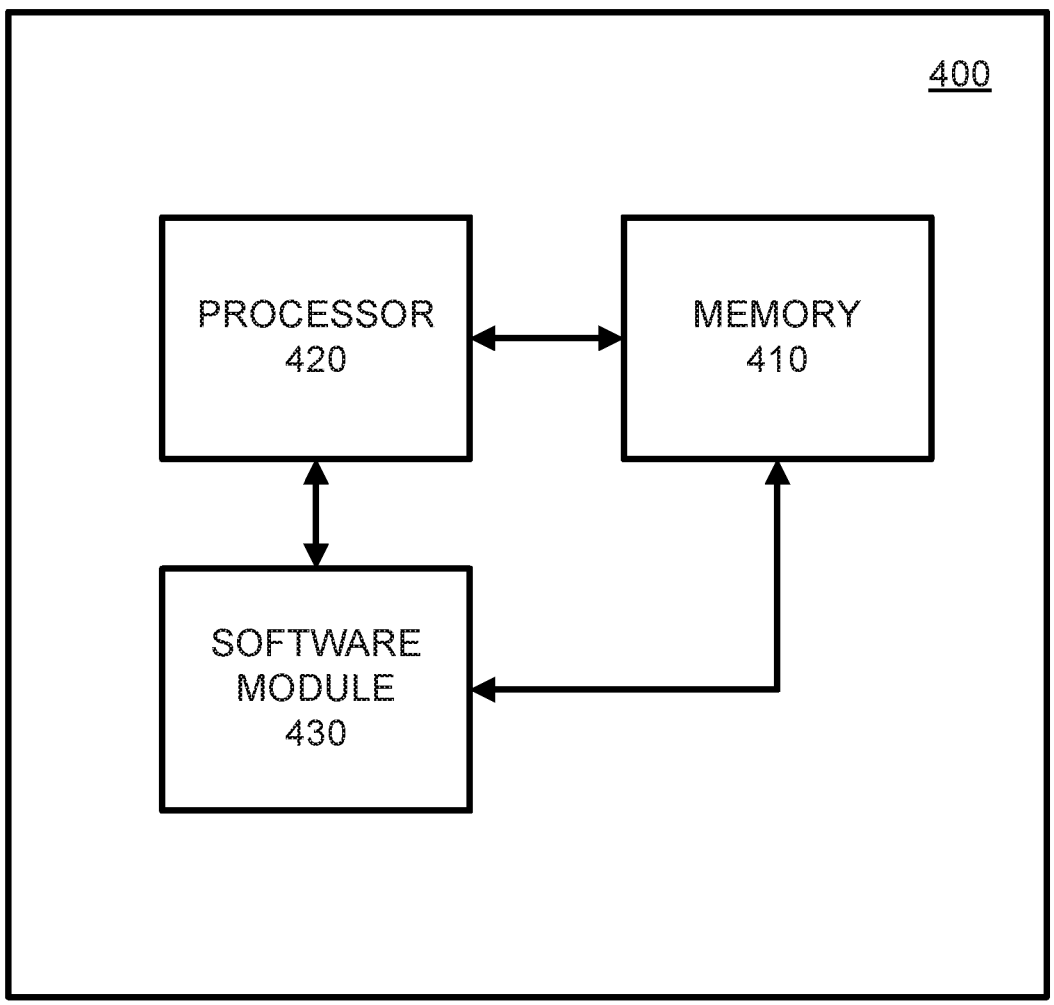
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
changing, via a node of a blockchain system, a status of a current blockchain of the blockchain system to a closed status and a retired status based on expiration of a limited time window defined in a smart contract implemented on the current blockchain;
creating, via the node, a genesis block associated with a new blockchain;
storing, via the node, a world state of the current blockchain in the genesis block;
modifying, via the node, the smart contract for the new blockchain;
communicating, via the node, the modified smart contract to the genesis block; and
writing, via the node, one or more potential blockchain transactions to the new blockchain based on an initiating of an open stage on the new blockchain, wherein the initiating of the open stage is based on the creation of the genesis block.

2. The method of claim 1, further comprising:
determining when to close the new blockchain based on a new limited time window; and
changing the new blockchain status to a closing state based on an expiration of the new limited time window.

3. The method of claim 2, comprising:
restricting an update to the blockchain to only a designated gardener node when the new blockchain status is changed to the closing state.

4. The method of claim 2, further comprising:
responsive to the determining when to close the new blockchain, initiating another new blockchain; and
determining world state information of the new blockchain that will be included in the another new blockchain.

5. The method of claim 4, further comprising:
creating a genesis block associated with the another new blockchain; and
setting a genesis block attribute of the genesis block associated with the another new blockchain to a hash value of a last block of the new blockchain.

6. The method of claim 5, further comprising:
initiating an open stage on the another new blockchain; and
inputting the world state information of the new blockchain in the another new blockchain.

7. The method of claim 6, further comprising:
responsive to initiating the open stage on the another new blockchain, transmitting notifications regarding closure of the new blockchain to members of the new blockchain; and
initiating a retiring status to the new blockchain that which prevents new transactions from being written to the new blockchain by any member of the blockchain.

8. A node of a blockchain system, the node, comprising a processor configured to:
change a status of a current blockchain of the blockchain system to a closed status and a retired status based on expiration of a limited time window defined in a smart contract implemented on the current blockchain;
create a genesis block associated with a new blockchain;
store a world state of the current blockchain in the genesis block;
modify the smart contract for the new blockchain;
communicate the modified smart contract to the genesis block;
write one or more potential blockchain transactions to the new blockchain based on an initiating of an open stage on the new blockchain, wherein the initiating of the open stage is based on the creation of the genesis block.

9. The apparatus of claim 8, wherein the processor is further configured to:
determine when to close the new blockchain based on a new limited time window; and
change the new blockchain status to a closing state based on an expiration of the new limited time window.

10. The apparatus of claim 9, wherein the processor is further configured to:
restrict an update to the blockchain to only a designated gardener node when the new blockchain status is changed to the closing state.

11. The apparatus of claim 9, wherein the processor is further configured to:

responsive to the determination of when to close the new blockchain, initiate another new blockchain; and determine world state information of the new blockchain that will be included in the another new blockchain.

12. The apparatus of claim 11, wherein the processor is further configured to:

create a genesis block associated with the another new blockchain; and set a genesis block attribute of the genesis block associated with the another new blockchain to a hash value of a last block of the new blockchain.

13. The apparatus of claim 12, wherein the processor is further configured to:

initiate an open stage on the another new blockchain; and input the world state information of the new blockchain in the another new blockchain.

14. The apparatus of claim 13, wherein the processor is further configured to:

responsive to initiation of the open stage on the another new blockchain, transmit notifications regarding closure of the new blockchain to members of the new blockchain; and initiate a retiring status to the new blockchain that prevents new transactions from being written to the new blockchain by any member of the blockchain.

15. A non-transitory computer readable storage medium configured to store one or more instructions that when executed by a processor cause the processor to perform:

changing, via a node of a blockchain system, a status of a current blockchain of the blockchain system to a closed status and a retired status based on expiration of a limited time window defined in a smart contract implemented on the current blockchain;

creating, via the node, a genesis block associated with a new blockchain;

storing, via the node, a world state of the current blockchain in the genesis block;

modifying, via the node, the smart contract for the new blockchain contracts;

communicating, via the node, the modified smart contract to the genesis block; and writing, via the node, one or more potential blockchain transactions to the new blockchain based on an initiating of an open stage on the new blockchain, wherein the initiating of the open stage is based on the creation of the genesis block.

16. The non-transitory computer readable storage medium of claim 15, further configured to store one or more instructions that when executed by the processor cause the processor to perform:

determining when to close the new blockchain based on a new limited time window; and changing the new blockchain status to a closing state based on an expiration of the new limited time window.

17. The non-transitory computer readable storage medium of claim 16, further configured to store one or more instructions that when executed by the processor cause the processor to perform:

restricting an update to the blockchain to only a designated gardener node when the new blockchain status is changed to the closing state.

18. The non-transitory computer readable storage medium of claim 16, further configured to store one or more instructions that when executed by the processor cause the processor to perform:

responsive to the determining when to close the new blockchain, initiating another new blockchain; and determining world state information of the new blockchain that will be included in the another new blockchain.

19. The non-transitory computer readable storage medium of claim 18, further configured to store one or more instructions that when executed by the processor cause the processor to perform:

creating a genesis block associated with the another new blockchain; and setting a genesis block attribute of the genesis block associated with the another new blockchain to a hash value of a last block of the new blockchain.

20. The non-transitory computer readable storage medium of claim 19, further configured to store one or more instructions that when executed by the processor cause the processor to perform:

initiating an open stage on the another new blockchain;

including the world state information of the new blockchain in the another new blockchain;

responsive to initiating the open stage on the another new blockchain, transmitting notifications regarding closure of the new blockchain to members of the new blockchain; and initiating a retiring status to the new blockchain that prevents new transactions from being written to the new blockchain by any member of the blockchain.

* * * * *